United States Patent
Boldrini et al.

(10) Patent No.: US 7,325,373 B2
(45) Date of Patent: Feb. 5, 2008

(54) ROTARY UNIT FOR ULTRASOUND SEALING CONTINUOUS TUBULAR STRIPS

(75) Inventors: Fulvio Boldrini, Ferrara (IT); Roberto Ghiotti, Calderino Monte San Pietro (IT); Stefano Cavallari, Bologna (IT)

(73) Assignee: Azionairia Constrizoni Macchine Automatiche A.C.M. S.p.A. (IT)

( * ) Notice: Subject to any disclaimer, the term of this patent is extended or adjusted under 35 U.S.C. 154(b) by 0 days.

(21) Appl. No.: 10/563,139

(22) PCT Filed: Apr. 20, 2005

(86) PCT No.: PCT/EP2005/051740

§ 371 (c)(1),
(2), (4) Date: Jul. 12, 2006

(87) PCT Pub. No.: WO2005/102844

PCT Pub. Date: Nov. 3, 2005

(65) Prior Publication Data

US 2007/0062158 A1   Mar. 22, 2007

(30) Foreign Application Priority Data

Apr. 22, 2004 (IT) .......................... BO2004A0241

(51) Int. Cl.
*B65B 51/10* (2006.01)
*B29C 65/08* (2006.01)

(52) U.S. Cl. ........................ 53/374.4; 53/550; 156/73.1

(58) Field of Classification Search ............... 156/73.1, 156/73.3, 580.1, 580.2; 53/450, 455, 477, 53/548, 550, 374.4

See application file for complete search history.

(56) References Cited

U.S. PATENT DOCUMENTS

| | | | | |
|---|---|---|---|---|
| 4,517,790 A | * | 5/1985 | Kreager | 156/580.1 |
| 4,534,818 A | | 8/1985 | Kreager et al. | 156/466 |
| 4,713,132 A | | 12/1987 | Abel et al. | 156/73.1 |
| 5,552,013 A | * | 9/1996 | Ehlert et al. | 156/580.2 |
| 6,454,890 B1 | * | 9/2002 | Couillard et al. | 156/73.1 |
| 6,574,944 B2 | * | 6/2003 | Capodieci | 53/550 |
| 6,780,263 B2 | * | 8/2004 | Delisle | 156/580.1 |
| 6,786,987 B2 | * | 9/2004 | Keen et al. | 156/580.1 |
| 7,059,103 B2 | * | 6/2006 | Ninomiya et al. | 53/450 |
| 2002/0189206 A1 | | 12/2002 | Capodieci | 53/450 |
| 2005/0092146 A1 | * | 5/2005 | Carbone et al. | 83/13 |

FOREIGN PATENT DOCUMENTS

| | | |
|---|---|---|
| JP | 2002059483 | 2/2002 |
| WO | WO 02/078935 A1 | 10/2002 |

* cited by examiner

*Primary Examiner*—Louis Huynh
(74) *Attorney, Agent, or Firm*—Ostrolenk, Faber, Gerb & Soffen, LLP

(57) ABSTRACT

A rotary unit, of an FFS (Form, Fill and Seal) machine, for ultrasound sealing a continuous tubular strip housing an orderly succession of products and fed along a feed path extending through a sealing station; the rotary unit having two substantially identical rotors located on opposite sides of the feed path, and which rotate in opposite directions about respective axes, and have respective pitch surfaces tangent to each other and to the feed path; and an ultrasound sealing head, forming part of one of the two rotors, cooperates at the sealing station with a corresponding anvil forming part of the other rotor, to close the tubular strip along a transverse seal line located at a respective portion of the tubular strip extending between two respective adjacent products.

11 Claims, 2 Drawing Sheets

ROTARY UNIT FOR ULTRASOUND SEALING CONTINUOUS TUBULAR STRIPS

CROSS REFERENCE TO RELATED APPLICATIONS

The present application is a 35 U.S.C. §371 national phase converison of International Application No. PCT/EP2005/051740 filed Apr. 20, 2005, which claims priority from Italian patent application No. BO2004A000241 filed Apr. 22, 2004.

TECHNICAL FIELD

The present invention relates to a unit for ultrasound sealing continuous tubular strips.

BACKGROUND ART

In FFS (Form, Fill and Seal) machines, a continuous tubular strip of thermoplastic material housing an orderly succession of products is known, for example, from U.S. Pat. No. 6,574,944, to be fed along a feed path extending through a rotary ultrasound sealing unit located at a sealing station and which provides for closing the tubular strip along a succession of transverse seal lines, each located along a respective portion of the tubular strip extending between two adjacent products.

The known rotary unit referred to above comprises a first and second rotor, which are located on opposite sides of the feed path, have respective pitch surfaces tangent to each other and to the feed path, and rotate in opposite directions about a first and, respectively, second axis, which are parallel to each other and define a plane through the sealing station and perpendicular to the feed path.

The first rotor is a sealing rotor having a number of radial sealing heads equally spaced about the first axis and having respective sealing surfaces forming part of the respective pitch surface. The first rotor also has an actuating, ultrasound converting device coaxial with the first axis of rotation. The second rotor is an anvil rotor having a number of radially projecting anvils, a contrasting end surface of each of which forms part of the relative pitch surface and reaches the sealing station in time with a respective sealing surface.

The two rotors of the above known rotary unit are therefore completely different, and so react differently to the forces to which they are subjected, thus resulting in undesired in-service vibration which, combined with the vibration of the rotary unit itself, may result in impaired operating precision and, at times, in damage to either one of the rotors.

DISCLOSURE OF INVENTION

It is an object of the present invention to improve the above known rotary unit to eliminate the aforementioned drawback.

According to the present invention, there is provided a rotary unit as claimed in Claim 1 or, preferably, in any one of the succeeding Claims depending directly or indirectly on Claim 1.

BRIEF DESCRIPTION OF THE DRAWINGS

A number of non-limiting embodiments of the present invention will be described by way of example with reference to the accompanying drawings, in which.

BEST MODE FOR CARRYING OUT THE INVENTION

Figure 1:
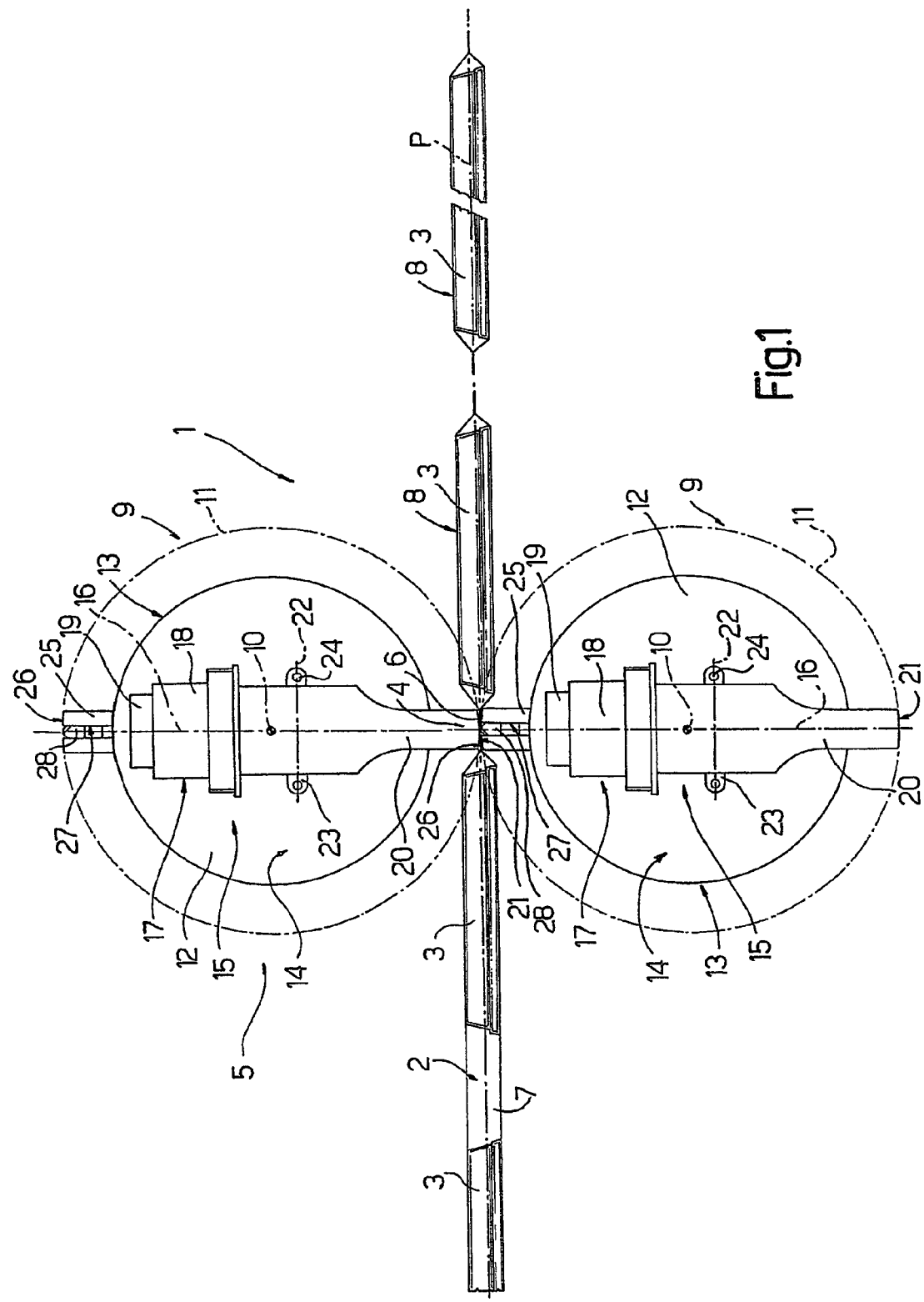
FIG. 1 shows a schematic side view, with parts removed for clarity, of a first preferred embodiment of the rotary unit according to the present invention.

Number 1 in FIG. 1 indicates as a whole an FFS (Form, Fill and Seal) machine, wherein a continuous tubular strip 2, housing an orderly succession of products 3, is fed in known manner (not shown) along a feed path P extending through a sealing station 4, where machine 1 comprises a rotary ultrasound sealing unit 5 for closing tubular strip 2 along seal lines 6 crosswise to the axis of tubular strip 2 and located along respective portions 7 of tubular strip 2 extending between respective pairs of adjacent products 3, and for cutting tubular strip 2 along seal lines 6 to form a succession of sealed wrappings 8 containing respective products 3.

The rotary unit comprises two substantially identical rotors 9, which are located on opposite sides of feed path P, rotate in opposite directions about respective axes 10 defining a plane perpendicular to feed path P at sealing station 4, and have respective cylindrical pitch surfaces 11 substantially tangent to each other and to feed path P. Each rotor 9 comprises a respective powered plate 12 coaxial with relative axis 10 and having a cylindrical peripheral surface 13 smaller in diameter than relative pitch surface 11.

A respective ultrasound sealing head 15 is fitted to each plate 12, is positioned facing a flat front surface 14 of plate 12 perpendicular to relative axis 10 and coplanar with a front surface 14 of the other plate 12, and has a longitudinal axis 16 extending along a diameter of relative plate 12 and intersecting path P in use.

Each ultrasound sealing head 15, which is known, comprises a respective actuating device 17 coaxial with axis 16 of sealing head 15 and defined by a transducer 18 having a counterweight 19 and for converting the electric energy supplied by an alternating electric source (not shown) into mechanical vibration; and a respective vibrating tool or horn 20 connected to relative transducer 18 and aligned with relative transducer 18 and relative counterweight 19 along relative longitudinal axis 16. At a free end, each horn 20 has a sealing surface 21, which is substantially perpendicular to relative longitudinal axis 16, is substantially rectangular with its major axis perpendicular to the FIG. 1 plane, is longer than the width of tubular strip 2, and extends along relative pitch surface 11.

At a respective nodal plane 22, horn 20 of each sealing head 15 has outer brackets 23 connected by elastic supports 24 to front surface 14 of relative plate 12.

Peripheral surface 13 of each plate 12 is fitted with an anvil 25 in the form of a prismatic block, which has a rectangular cross section, projects radially with respect to relative peripheral surface 13 and axially with respect to relative front surface 14, and is bounded radially outwards by a contrast surface 26 diametrically opposite and substantially identical to relative sealing surface 21, and extending along relative pitch surface 11. A slit 27 is formed, parallel to relative axis 10, through each contrast surface 26 and houses a blade 28.

In actual use, rotors 9 are offset 180° with respect to each other, and are rotated in opposite directions with the same law of motion, so that sealing surface 21 of one rotor 9 travels through sealing station 4 in time with the corresponding contrast surface 26 of the other rotor 9 and with a relative portion 7 of tubular strip 2, and so that the corresponding said sealing surface 21 and contrast surface 26 travel about relative axes 10 at variable linear speeds maintained equal to each other at all times and normally greater than the travelling speed of tubular strip 2, but travel through sealing station 4 at the same speed equal to the travelling speed of tubular strip 2. The same result may be achieved, for example, by connecting each rotor 9 in known manner to a respective "brushless" electric motor (not shown) controlled by a central control unit (not shown).

As they roll against each other at sealing station 4, a sealing surface 21 and corresponding contrast surface 26 grip relative portion 7 and reduce it to two superimposed contacting layers of thermoplastic material, which are sealed to each other by relative sealing head 15 along relative seal line 6 (which, in the example shown, is a sealing strip of roughly the same width as relative sealing surface 21). At the same time, relative blade 28 interferes with tubular strip 2 to cut it along relative seal line 6 and detach from tubular strip 2 a sealed wrapping 8 housing a relative product 3.

In connection with the above, it should be pointed out that any size change, which normally means changing the spacing of portions 7, can be made by simply changing the law of motion of rotors 9; and rotors 9, being identical, not only perform dynamically in exactly the same way, but also permit a considerable reduction in both the construction and maintenance cost of rotary unit 5.

In connection with the above, it should also be pointed out that, as opposed to being performed substantially simultaneously, as in rotary unit 5, sealing and cutting may be performed at different times by eliminating blades 28 of anvils 25 and detaching sealed wrappings 8 at a downstream cutting station.

Figure 2:
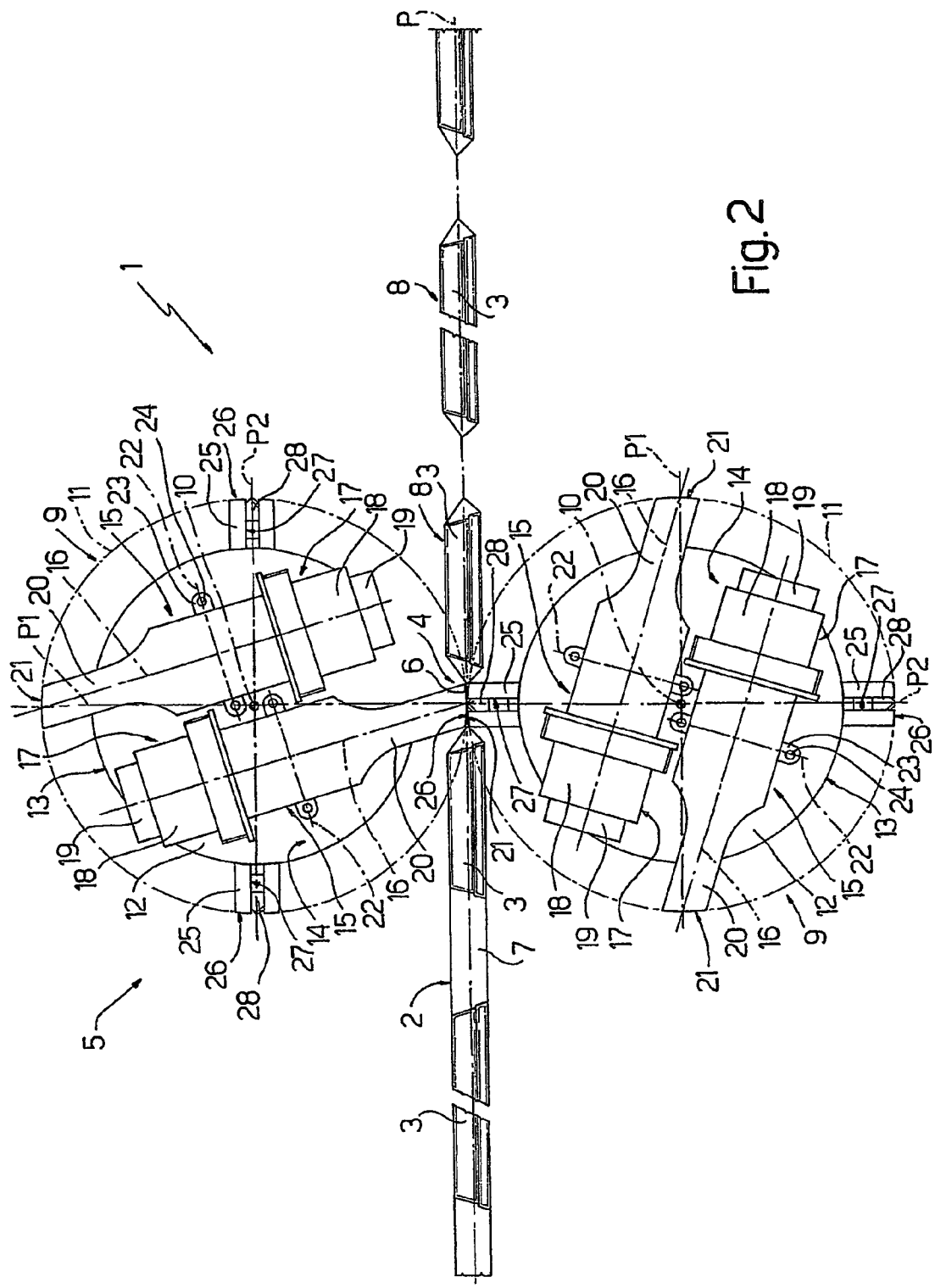
FIG. 2 shows a schematic side view, with parts removed for clarity, of a second preferred embodiment of the rotary unit according to the present invention.

The FIG. 2 embodiment shows a rotary unit 5, in which, rotors 9 are still substantially identical, but each comprises two sealing heads 15 and two anvils 25, and provides, with plates 12 of the same size as those in the FIG. 1 embodiment, for producing shorter sealed wrappings 8 than on the FIG. 1 rotary unit 5.

In the FIG. 2 rotary unit 5, the two sealing heads 15 of each rotor 9 are parallel, face opposite ways, and are fitted to relative plate 12 on opposite sides of relative axis 10 and with relative sealing surfaces 21 diametrically opposite each other in a diametrical plane P1; and the two anvils 25 are fitted to relative plate 12 diametrically opposite each other in a diametrical plane P2 perpendicular to plane P1.

In actual use, the two rotors 9 in the FIG. 2 embodiment obviously rotate, offset 90° with respect to each other, about respective axes 10.

Rotors 9 may also be produced, each comprising a number of sealing heads 15 and an equal number of anvils 25. In which variation (not shown), horns 20 may project radially from a single actuating device 17, and anvils 25 may be the same as in the FIGS. 1 and 2 embodiments.

As in the FIGS. 1 and 2 embodiments, in the above variation (not shown), the sealing surfaces 21 and contrast surfaces 26 of each rotor 9 define respective portions of relative pitch surface 11, and alternate along relative pitch surface 11 and about relative axis 10; each sealing surface 21 defines, with each adjacent contrast surface 26 and along respective pitch surface 11, an arc extending about respective axis 10 and subtended by a central angle which is constant for each pair of adjacent sealing and contrast surfaces 21 and 26; and the two rotors 9 are offset angularly by said central angle.

The invention claimed is:

1. A rotary unit of an FFS (Form, Fill and Seal) machine for ultrasound sealing of a continuous tubular strip housing an orderly succession of products and fed along a feed path extending through a sealing station, the rotary unit comprising:
   two rotors located on opposite sides of the feed path, rotating in opposite directions about respective axes of rotation, and having respective pitch surfaces tangent to each other and to the feed path;
   an ultrasound sealing head forming part of one of the rotors and cooperating at the sealing station with a corresponding anvil forming part of the other rotor to close the tubular strip along a transverse seal line located at a respective portion of the tubular strip extending between two respective adjacent products, the sealing head comprising a respective actuating device coaxial with an axis of the sealing head,
   wherein each of said two rotors comprises a predetermined number of sealing heads and an equal number of anvils, wherein the two rotors are identical, wherein each sealing head has a respective sealing surface and each anvil has a respective contrast surface, and wherein said sealing surface and said contrast surface define respective portions of the pitch surface of a respective rotor.

2. A unit as claimed in claim 1, wherein said sealing surfaces and said contrast surfaces of each rotor alternate along the pitch surface of the respective rotor and about the respective axis of rotation.

3. A unit as claimed in claim 2, wherein said sealing surface with each adjacent contrast surface of each rotor defines an arc extending along the respective pitch surface about the respective axis of rotation and subtended by a central angle which is constant for each pair of adjacent sealing and contrast surfaces.

4. A unit as claimed in claim 3, wherein the two rotors are offset angularly by said central angle.

5. A unit as claimed in claim 1, wherein each said rotor comprises only one sealing head having a respective sealing surface; and only one anvil having a respective contrast surface; said sealing surface and said contrast surface being diametrically opposite along the pitch surface of the respective rotor.

6. A unit as claimed in claim 5, wherein said sealing head has a longitudinal axis perpendicular to the relative axis of rotation.

7. A unit as claimed in claim 1, wherein each said rotor comprises two anvils having respective contrast surfaces and two sealing heads having respective longitudinal axes positioned parallel to each other and crosswise to the relative axis of rotation and located on opposite sides of the axis of rotation; said two sealing heads having respective sealing surface diametrically opposite along the pitch susface of the relative rotor and lying in a first diametrical plane; and said two contrast surfaces being diametrically opposite along the pitch surface of the relative rotor and lying in a second diametrical plane perpendicular to the first diametrical plane.

8. A unit as claimed in claim 1, wherein each anvil has a blade which cooperates, at said sealing station, with the corresponding sealing head to cut the tubular strip along the transverse seal line.

9. A rotary unit of an FFS (Form, Fill and Seal) machine for ultrasound sealing of a continuous tubular strip housing an orderly succession of products and fed along a feed path extending through a sealing station, the rotary unit comprising:

two rotors located on opposite sides of the feed path and rotating in opposite directions about respective axes of rotation, the two rotors having respective pitch surfaces tangent to each other and to the feed path; and an ultrasound sealing head forming part of one of the two rotors, the sealing head cooperating at the sealing station with a corresponding anvil forming part of the rotor to close the tubular strip along a transverse seal line located at a respective portion of the tubular strip extending between two respective adjacent products, the ultrasound sealing head comprising a respective actuating device coaxial with an axis of the sealing head, wherein each of said two rotors comprises only one sealing head having a respective sealing surface and only one anvil having a respective contrast surface, and wherein said sealing surface and said contrast surface are diametrically opposite along the pitch surface of a respective rotor.

10. A unit as claimed in claim 9, wherein said sealing head has a longitudinal axis perpendicular to the resepective axis of rotation.

11. A rotary unit of an FFS (Form, Fill and Seal) machine for ultrasound sealing of a continuous tubular strip housing an orderly succession of products and fed along a feed path extending through a sealing station, the rotary unit comprising:

two rotors located on opposite sides of the feed path and rotating in opposite directions about respective axes of rotation, the two rotors having respective pitch surfaces tangent to each other and to the feed path; and an ultrasound sealing head forming part of one of the two rotors and cooperating at the sealing station with a corresponding anvil forming part of the other rotor to close the tubular strip along a transverse seal line located at a respective portion of the tublar strip extending between two respective adjacent products, the sealing head comprising a respective actuating device coaxial with an axis of the sealing head, wherein each of said two rotors comprises two anvils having respective contrast surfaces and two sealing heads having respective longitudinal axes parallel to each other crosswise to the relative axis of rotation and located on opposite sides of the axis of rotation, wherein said two sealing heads have respective sealing surfaces diametrically opposite along the pitch surface of the relative rotor and lying in a first diametrical plane, and wherein said two contrast surfaces are diametrically opposite along the pitch surface of the relative rotor and lie in a second diametrical plane perpendicular to the first diametrical plane.

* * * * *

UNITED STATES PATENT AND TRADEMARK OFFICE
CERTIFICATE OF CORRECTION

PATENT NO. : 7,325,373 B2
APPLICATION NO. : 10/563139
DATED : February 5, 2008
INVENTOR(S) : Fulvio Boldrini, Roberto Ghiotti and Stefano Cavallari It is certified that error appears in the above-identified patent and that said Letters Patent is hereby corrected as shown below:

Title Page, Item (73) Assignee should read:
Azionaria Costruzioni Macchine Automatiche A.C.M.A. S.p.A., Bologna, Italy.

Signed and Sealed this

Twenty-ninth Day of December, 2009

David J. Kappos
*Director of the United States Patent and Trademark Office*